US006088495A

United States Patent [19]
Vorobeichik et al.

[11] Patent Number: 6,088,495
[45] Date of Patent: Jul. 11, 2000

[54] INTERMEDIATE-STATE-ASSISTED OPTICAL COUPLER

[75] Inventors: Ilya Vorobeichik, Ashdod; Nimrod Moiseyev; Meir Orenstein, both of Haifa, all of Israel

[73] Assignee: Technion Research & Development Foundation Ltd., Haifa, Israel

[21] Appl. No.: 09/063,808

[22] Filed: Apr. 21, 1998

[51] Int. Cl.[7] .................................................. G02B 6/26
[52] U.S. Cl. ............................... 385/28; 385/27; 385/37; 385/39
[58] Field of Search .............................. 385/31, 37, 39, 385/42, 43, 27, 28, 4–10

[56] References Cited

U.S. PATENT DOCUMENTS

| | | | |
|---|---|---|---|
| 3,882,430 | 5/1975 | Maerfeld | 333/153 |
| 4,792,207 | 12/1988 | Shaw et al. | 385/28 |
| 4,872,738 | 10/1989 | Risk et al. | 359/285 |
| 5,416,866 | 5/1995 | Sahlen | 385/37 |
| 5,488,679 | 1/1996 | Wu | 385/15 |
| 5,915,050 | 6/1999 | Russell et al. | 385/7 |

OTHER PUBLICATIONS

Yu et al, "A Comparison of Beam Propogation and Couple–Mode Metthods: Application to Opticaaal Fiber Couplers", *J. Lightwaave Tech.*, 12(5): 797–802, May, 1994.
Haruvi–Busnach et al, "Beam Propogation Algorithms for Frequency Response of Surface Acoustic Wave Directional Couplers", *J. Appl. Phys.*, 80(12): 6614–6618, Dec. 1996.
Griffel et al, "Frequency Response and Tunability of Grating–Assissted Directional Couplers", *IEEE J. Quantum Electronics*, 27(5): 1115–1118, May 1991.

*Primary Examiner*—John D. Lee
*Assistant Examiner*—Juliana K. Kang
*Attorney, Agent, or Firm*—Mark M. Friedman

[57] ABSTRACT

An optical coupler, for coupling two waveguides, and an optical switch based on the optical coupler. The indices of refraction of parallel sections of the two waveguides are reversibly perturbed periodically in space to couple low order modes in the two waveguides via a high order mode common to the two waveguides. The waveguides are thus couples with a beat length that may be five or more orders of magnitude shorter than it would be without the periodic perturbations.

18 Claims, 4 Drawing Sheets

INTERMEDIATE-STATE-ASSISTED OPTICAL COUPLER

FIELD AND BACKGROUND OF THE INVENTION

The present invention relates to optical communications devices and, more particularly, to optical couplers.

An optical coupler is a device for exchanging light between two optical waveguides. An optical waveguide is a device for transmitting light over long distances with low losses. It consists of a linearly extended guide portion, having a relatively high index of refraction, encased in a cladding having a lower index of refraction. Light is confined to the guide portion by total internal reflection. Common examples of optical waveguides include planar waveguide structures, which, for the transmission of infrared light, often are made from semiconductors in the same way as integrated circuits, and optical fibers. In an optical fiber, the guide portion conventionally is called a "core". The illustrative examples herein include both systems based on optical fibers, as embodiments of the present invention, and systems based on planar waveguide structures, as computational model systems for the theory of the present invention. It will be understood that the principles of the present invention apply to all optical waveguides, and not just to planar waveguide structures and optical fibers.

A directional coupler, in particular, consists of two parallel waveguides in close proximity to each other. The theory of directional couplers is described in D. Marcuse, Theory of Dielectric Optical Waveguides, Academic Press, Second Edition, 1991, Chapter 6, which is incorporated by reference for all purposes as if fully set forth herein. Two identical waveguides, far apart from each other, have identical propagation modes, with identical propagation constants. As the two waveguides are brought closer to each other, pairs of corresponding modes become coupled. The solutions of Maxwell's equations are, to a close approximation, sums (even symmetry) and differences (odd symmetry) of the corresponding uncoupled modes, each solution having its own propagation constant that is slightly different from the propagation constants of the corresponding uncoupled modes. Monochromatic light entering a directional coupler via the guide portion of one of the waveguides in one uncoupled mode thus is a linear combination of two coupled modes. Therefore, this light is exchanged between the guide portions of the two waveguides. After propagating through the directional coupler for a distance called the "beat length", the light has been transferred entirely to the guide portion of the other waveguide. Of course, if the directional coupler is longer than the beat length, the light returns to the guide portion of the first waveguide. The beat length is inversely proportional to the difference between the coupled propagation constants. Specifically, the beat length $L=\pi/(\beta_e-\beta_o)$, where $\beta_e$ is the propagation constant of the coupled even mode and $\beta_o$ is the propagation constant of the coupled odd mode. These propagation constants are functions of the indices of refraction of the guide portions and of the intervening optical medium, and of the wavelength of the light.

The closer the guide portions are to each other, the larger the difference between the coupled propagation constants. In practical optical couplers of this type, in order to keep the beat length, and hence the length of the device, on the order of centimeters, the distance between the coupled guide portions often must be on the order of micrometers. This dimensional restriction increases the cost and complexity of the couplers. There is thus a widely recognized need for, and it would be highly advantageous to have, an optical coupler including a mechanism for reducing the beat length, or, equivalently, allowing the coupled guide portions to be spaced farther apart for a given beat length. If such a mechanism were reversible, the resulting optical coupler also could be used as an optical switch or a variable coupler.

SUMMARY OF THE INVENTION

According to the present invention there is provided an optical coupler, including: (a) a first optical waveguide including a guide portion, the guide portion including a coupling section having a certain length; (b) a second optical waveguide including a guide portion, the guide portion including a coupling section substantially parallel to the coupling section of the guide portion of the first optical waveguide, the coupling section of the guide portion of the second optical waveguide having a certain length; (c) an optical medium intervening between the coupling sections, thereby providing the coupling sections with a certain beat length, with respect to monochromatic light transmitted by the waveguides, that is longer than a larger of the lengths of the coupling sections; and (d) a coupling enhancement mechanism operative to reduce the beat length to below a smaller of the lengths of the coupling sections by coupling at least one mode confined to the coupling section of the first waveguide with at least one mode confined to the coupling section of the second waveguide via at least one mode common to both of the coupling sections.

According to the present invention there is provided an optical system, including: (a) a first optical waveguide including a guide portion, the guide portion including a plurality of coupling sections, each of the coupling sections of the guide portion of the first optical waveguide having a certain length; (b) a plurality of second optical waveguides, each of the second optical waveguides including a guide portion, the guide portion of the each second optical waveguide including a coupling section substantially parallel to a corresponding one of the coupling sections of the guide portion of the first optical waveguide, the coupling section of the guide portion of the each second optical waveguide having a certain length; and (c) for each of the second optical waveguides: (i) an optical medium intervening between the coupling section of the guide portion of the each second optical waveguide and the corresponding coupling section of the guide portion of the first waveguide, thereby providing the coupling section of the guide portion of the each second optical waveguide and the corresponding coupling section of the guide portion of the first waveguide with a certain beat length, with respect to monochromatic light transmitted by the waveguides, that is longer than a larger of the length of the coupling section of the guide portion of the each second waveguide and the length of the corresponding coupling section of the guide portion of the first waveguide, and (ii) a coupling enhancement mechanism operative to reduce the beat length to below a smaller of the length of the coupling section of the guide portion of the each second waveguide and the length of the corresponding coupling section of the guide portion of the first waveguide; the coupling enhancement mechanism of at least one of the second optical waveguides being operative to couple at least one mode confined to the coupling section of the at least one second waveguide with at least one mode confined to the corresponding coupling section of the first waveguide via at least one mode common to both of the coupling sections.

According to the present invention there is provided an optical coupler, including: (a) a first optical waveguide including a guide portion having a first index of refraction, the guide portion including a coupling section; (b) a second optical waveguide including a guide portion having a second index of refraction, the guide portion of the second optical waveguide including a coupling section parallel to the coupling section of the guide portion of the first optical waveguide; (c) a mechanism for imposing a periodic structure on the first index of refraction; and (d) a mechanism for imposing a periodic structure on the second index of refraction.

According to the present invention there is provided an optical system including: (a) a first optical waveguide including a guide portion having an index of refraction, the guide portion including a plurality of coupling sections; (b) a plurality of second optical waveguides, each of the second optical waveguides including a guide portion having an index of refraction, the guide portion of the each second optical waveguide including a coupling section substantially parallel to a corresponding one of the coupling sections of the guide portion of the first optical waveguide, the coupling section of the guide portion of the each second optical waveguide being substantially parallel to the corresponding coupling section of the guide portion of the first waveguide; and (c) for each of the second optical waveguides: (i) a mechanism for imposing a periodic structure on the index of refraction of the guide portion of the each second optical waveguide, and (ii) a mechanism for imposing a periodic structure on the index of refraction of the guide portion of the first waveguide in the corresponding coupling section of the guide portion of the first waveguide.

FIG. 1 illustrates, in longitudinal cross section, an optical coupler 28 of the prior art that couples two optical fibers 10 and 20. Fiber 10 includes a core 12 surrounded by a cladding 14, which is in turn surrounded by a protective coating 16. Similarly, fiber 20 includes a core 22 surrounded by a cladding 24 which is in turn surrounded by a protective coating. To obtain total internal reflection of light in cores 12 and 22, cores 12 and 22 are given indices of refraction higher than the respective surrounding claddings 14 and 24. Optical coupler 28 is formed by stripping off part of protective coatings 16 and 26 and inserting the stripped sections in a capillary 18. Capillary 18 is heated and squeezed to merge claddings 14 and 24 between cores 12 and 22 and bring cores 12 and 22 close enough to each other that the beat length of cores 12 and 22 is equal to the length of optical coupler 28.

In addition to the low order coupled modes discussed above, the solutions of Maxwell's equations for optical coupler 28 and similar devices include high order mode solutions that span both waveguides and that are not simple linear combinations of two uncoupled modes. It has been discovered that by imposing a periodically varying spatial structure on the indices of refraction of cores 12 and 22, two weakly coupled low order modes can be further coupled through one or more of the higher modes. This additional coupling can reduce the beat length by several orders of magnitude. The theory of the present invention is described in the Annex. The examples presented therein include an example of off-resonance coupling, in which the beat length is reduced by more than three orders of magnitude, and an example of on-resonance coupling, in which the beat length is reduced by more than five orders of magnitude. Thus, off-resonance coupling can give a length of under a centimeter to a device that otherwise would be 10 meters long; and on-resonance coupling can give a length of under a centimeter to a device that otherwise would be one kilometer long. Similarly, off-resonance coupling allows a device whose length otherwise would be a centimeter to be 100 micrometers long and so fabricated as a planar waveguide structure. Note that in the latter example, only two of the three orders of magnitude of size reduction available from off-resonance coupling are exploited.

Periodic variation of the index of refraction of an optical fiber is commonly used for optical filtering, and also has been used, as described in U.S. Pat. No. 4,872,738 of Risk et al., which patent is incorporated by reference for all purposes as if fully set forth herein, to couple different modes within the same optical fiber in order to achieve frequency shifting. A static periodic grating structure also is used on one of two dissimilar optical waveguides, in so-called grating-assisted directional couplers, to phase match the waveguides. This periodic grating structure operates by coupling two low order modes of the two waveguides.

As noted above, the beat length of cores 12 and 22 is a function of the frequency of the monochromatic light that is transmitted therein: the higher the frequency, the shorter the wavelength, and so the weaker the coupling between cores 12 and 22 and the longer the beat length. Guide regions such as cores 12 and 22 typically are designed to have small transverse dimensions in order to transmit only the fundamental mode of the target frequency. These small transverse dimensions also provide cores 12 and 22 with effective "high pass" frequencies: light of lower frequencies is not transmitted at all. Absent these high pass frequencies, the present invention could not be defined conveniently in terms of beat length, because a beat length lower than a given value could be obtained by using light of a sufficiently low frequency. Insofar as the present invention is defined in terms of a specific beat length, the intended beat length is the beat length corresponding to this high pass frequency. If two optically coupled cores have different high pass frequencies, then the present invention is defined in terms of the beat length corresponding to the higher of the two high pass frequencies. Preferably, in the present invention, all optically coupled guide portions have the same (unstressed) indices of refraction and the same transverse dimensions, so that all optically coupled guide portions have the same high pass frequencies.

An optical coupler of the present invention is similar to prior art optical coupler 28, with the addition of a mechanism to reversibly impose periodic variations on the indices of refraction of the cores. Such mechanisms are well known in the art, and may be based on periodic mechanical pressure or on interactions with acoustic or electromagnetic radiation. Such an optical coupler is an optical switch: as long as the periodic variations are imposed, light is transferred from one core to the other; otherwise, no light is transferred. An optical multiplexer may be created by coupling one input optical fiber with several output optical fibers in this manner.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an optical coupler in which the beat length of the coupled guide portions of the waveguides is reduced by periodic perturbations of the indices of refraction. The present invention can be used as an optical switch or as an optical multiplexer.

The principles and operation of an optical coupler according to the present invention may be better understood with reference to the drawings and the accompanying description.

Figure 1:
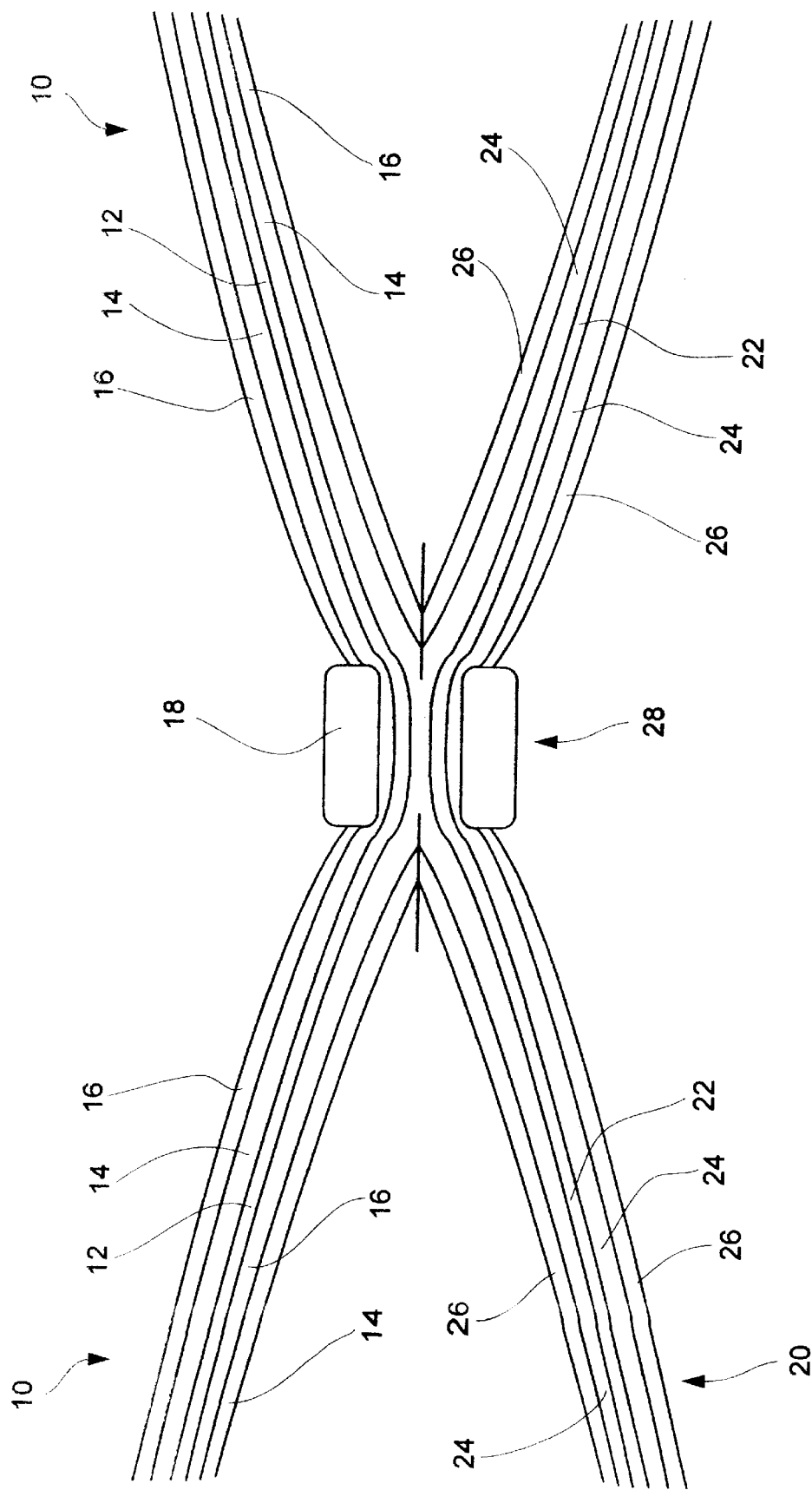
FIG. 1 is a longitudinal cross section of a prior art optical coupler.
Figure 2:
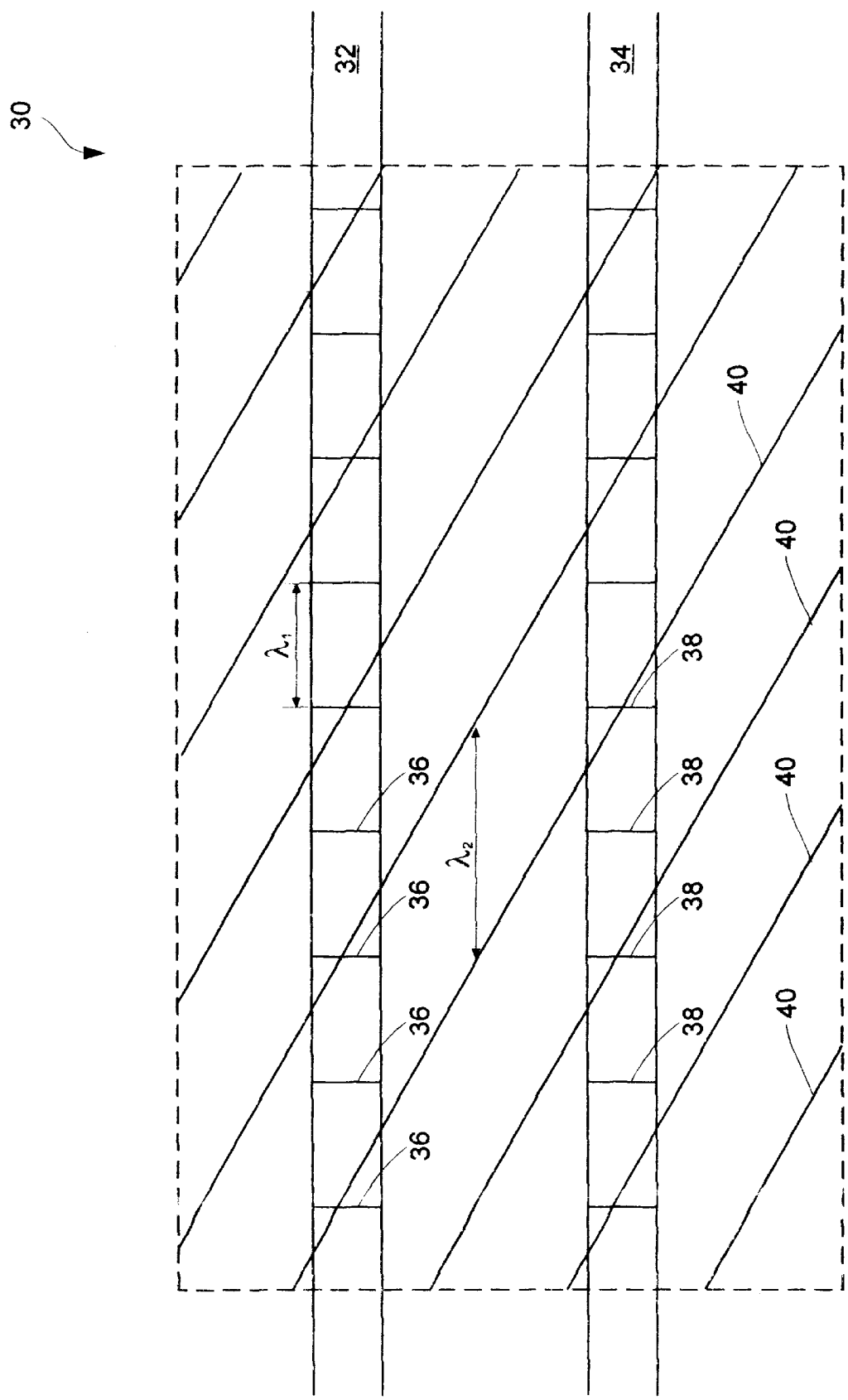
FIG. 2 illustrates, heuristically, the principle of the present invention.

Referring now to the drawings, FIG. 2 is a heuristic presentation of the principle of the present invention. Parallel cores 32 and 34 of two optical fibers are coupled in a coupling region 30. Cores 32 and 34 are dimensioned to transmit only fundamental modes, which propagate in the direction of the longitudinal axes of cores 32 and 34, with wavefronts (lines of equal phase) 36 and 38 that are perpendicular to the longitudinal axes of cores 32 and 34. Coupling region 30 also supports other modes, for example, the mode illustrated in FIG. 1(b) of the Annex. This mode has zero crossings in the direction transverse to cores 32 and 34, corresponding to the propagation of this mode in an oblique direction relative to the longitudinal axes of cores 32 and 34. Some of the wavefronts of one of these higher modes are designated in FIG. 2 by reference numeral 40. Note that the projection of wavefronts 40 onto cores 32 and 34 has a significantly longer wavelength $\lambda_2$ than the wavelength $\lambda_1$ wavefronts 36 and 38. Perturbing the indices of refraction of cores 32 and 34 periodically, at a wavelength $\lambda_3$ such that $1/\lambda_3 = 1/\lambda_1 - 1/\lambda_2$, couples the modes with wavefronts 36 and 38 via the mode with wavefronts 40. In the numerical example presented in the Annex, $\lambda_1$ is 0.75 micrometers (1.5 micrometer free space wavelength divided by index of refraction $n_0=2$) and $\lambda_3$ is 50 micrometers.

More precisely, the coupled even mode propagation constant He is slightly larger than the uncoupled fundamental mode propagation constant $\beta_e$ and the odd mode propagation constant $\beta_o$ is slightly smaller than $2\pi/\lambda_1$. As noted above, the beat length is proportional to the difference between $\beta_e$ and $\beta_o$. The spatial frequency ($2\pi$/wavelength) of the perturbation is close to (off-resonance) or equal to (on resonance) the difference between either $\beta_e$ or $\beta_o$ and the smaller propagation constant of the higher mode. This spatial frequency typically is much larger than $\beta_e-\beta_o$, so $\lambda_3$ is much smaller than the beat length.

$\lambda_3$ also typically is significantly longer than $\lambda_1$. This minimizes power dissipation via coupling to radiative modes.

Figure 3:
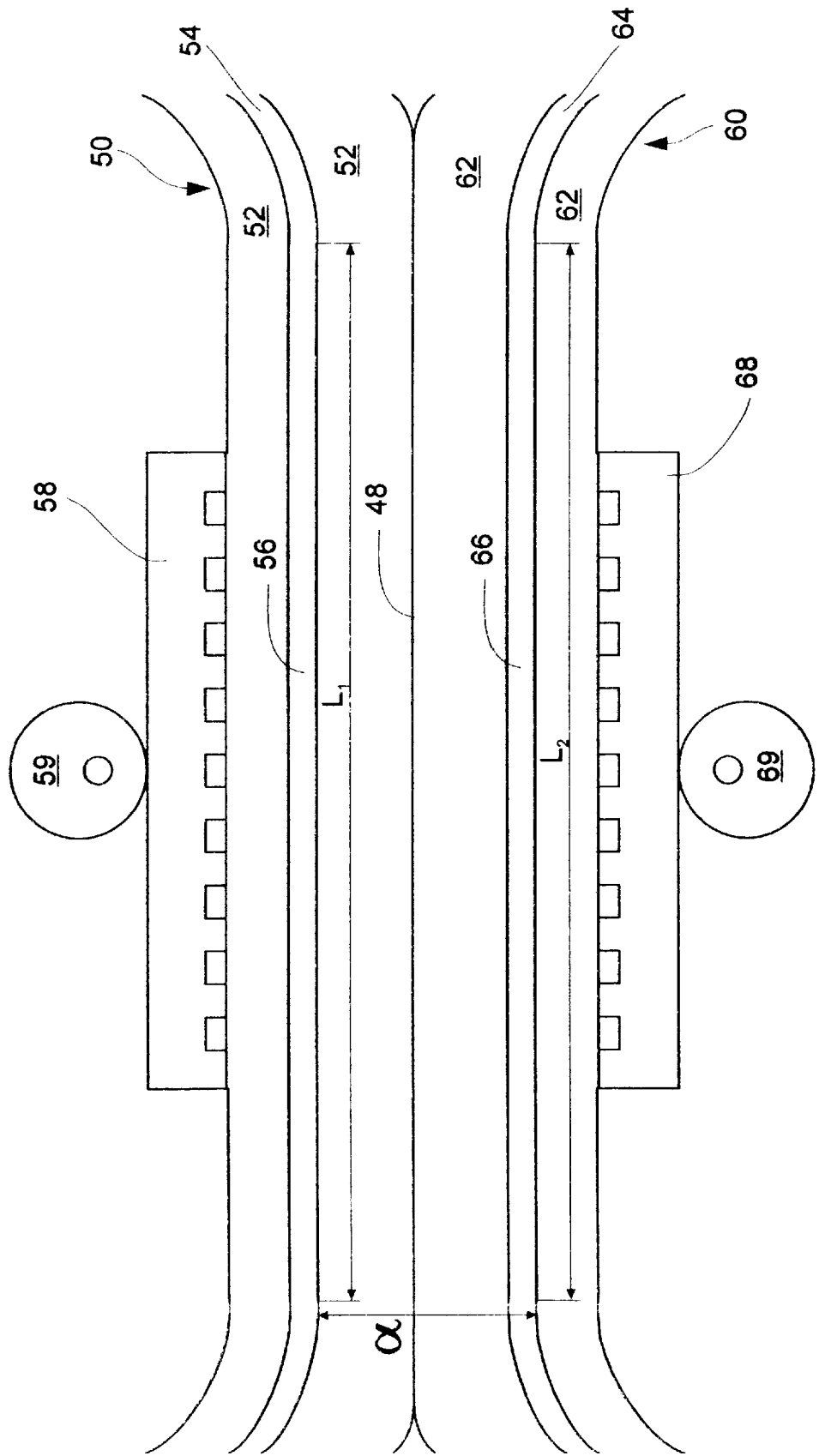
FIG. 3 is a longitudinal cross section of an optical switch of the present invention.

FIG. 3 shows, in schematic longitudinal cross-section, an optical switch of the present invention for reversibly coupling two optical fibers 50 and 60. Optical fiber 50 includes a core 54 encased in a cladding 52. Similarly, optical fiber 60 includes a core 64 encased in a cladding 62. Claddings 52 and 62 are in contact along a boundary 48. The parallel portions of cores 54 and 64 adjacent to boundary 48 constitute coupling sections 56 and 66. The portions of claddings 52 and 62 between coupling sections 56 and 66 constitute an optical medium intervening between coupling sections 56 and 66: the indices of refraction of coupling sections 56 and 66 and of claddings 52 and 62, along with the distance d between coupling sections 56 and 66, define a beat length for coupling sections 56 and 66 with respect to monochromatic light transmitted by coupling sections 56 and 66.

On opposite sides of optical fibers 50 and 60, parallel to coupling sections 56 and 66, are planar gratings 58 and 68 and cams 59 and 69. In the illustrated positions of cams 59 and 69, optical fibers 50 and 60 are unstressed, and the indices of refraction of coupling sections 56 and 66 are longitudinally homogeneous. By rotating cams 59 and 69, a longitudinally periodic mechanical stress field is imposed on optical fibers 50 and 60, producing longitudinally periodic structures of equal wavelengths in the indices of refraction of coupling sections 56 and 66.

Gratings 58 and 68, and cams 59 and 69, together constitute a mechanism for reducing the beat length of coupling sections 56 and 66, from above the greater of length $l_1$ of coupling section 56 and length $l_2$ of coupling section 66, to below the smaller of $l_1$ and $l_2$. Preferably, of course, $l_1$ and $l_2$ are approximately equal, as drawn.

Other mechanisms for reversibly imposing a periodic structure on the indices of refraction of coupling sections 56 and 66 are well known in the art. These include mechanisms based on imposing acoustic waves on optical fibers 50 and 60, as described in the background section of the above-referenced patent of Risk et al. These also include the electro-optic effect, and electromagnetic perturbation mechanisms, such as irradiation of optical fibers 50 and 60 with ultraviolet light whose intensity has the desired spatial periodicity.

Figure 4:
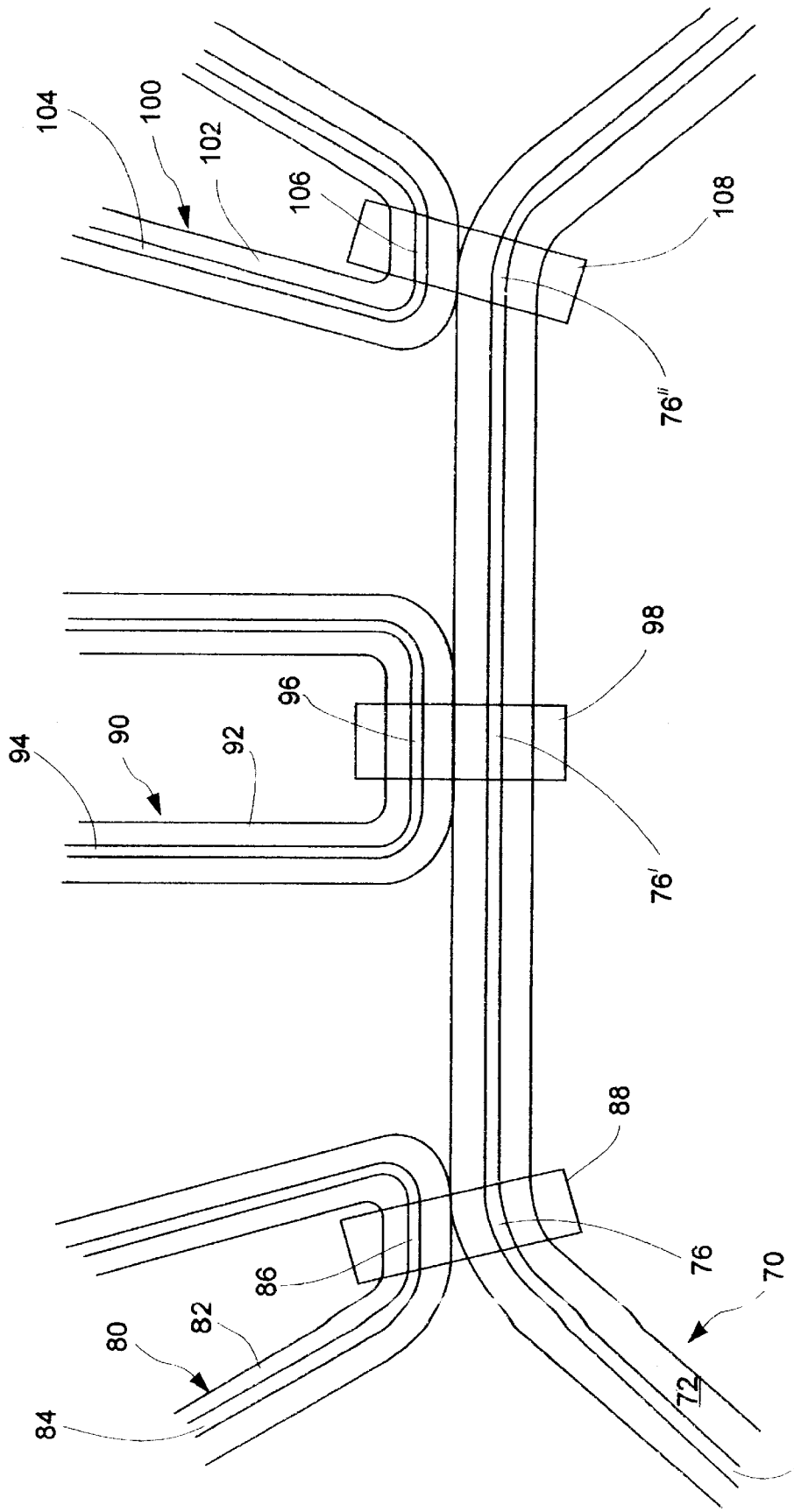
FIG. 4 is a longitudinal cross section of an optical multiplexer of the present invention.

FIG. 4 illustrates, in schematic longitudinal cross-section, a multiplexer of the present invention, for diverting optical signals from an input optical fiber 70 to output optical fibers 80, 90 and 100. Optical fiber 70 includes a core 74 surrounded by a cladding 72. Similarly, optical fiber 80 includes a core 84 surrounded by a cladding 82; optical fiber 90 includes a core 94 surrounded by a cladding 92; and optical fiber 100 includes a core 104 surrounded by a cladding 102. Parallel sections 76 and 86 of cores 74 and 84 constitute coupling sections of cores 74 and 84 that are separated by an intervening optical medium made up of the sections of claddings 72 and 82 between coupling sections 76 and 86. Similarly, parallel sections 76' and 96 of cores 74 and 94 constitute coupling sections of cores 74 and 94 that are separated by an intervening optical medium made up of the sections of claddings 72 and 92 between coupling sections 76' and 96; and parallel sections 76" and 106 of cores 74 and 104 constitute coupling sections of cores 74 and 104 that are separated by an intervening optical medium made up of the sections of claddings 72 and 102 between coupling sections 76" and 106. Coupling sections 76 and 86 are provided with a coupling enhancement mechanism 88 that reversibly increases the coupling of coupling sections 76 and 86, thereby decreasing the beat length of coupling sections 76 and 86, by imposing thereon periodicity in the indices of refraction thereof. Coupling enhancement mechanism 88 may be mechanical, like the grating and cam mechanism of FIG. 3. Alternatively, coupling enhancement mechanism 88 reversibly perturbs coupling sections 76 and 86 with incident acoustic or electromagnetic radiation as described above. Similarly, coupling sections 76' and 96 are provided with a coupling enhancement mechanism 98 that is similar to coupling enhancement mechanism 88; and coupling sections 76" and 106 are provided with a coupling enhancement mechanism 108 that also is similar to coupling enhancement mechanism 88.

While the invention has been described with respect to a limited number of embodiments, it will be appreciated that many variations, modifications and other applications of the invention may be made.

Annex

What is claimed is:

1. An optical coupler, comprising:
   (a) a first optical waveguide including a guide portion, said guide portion including a coupling section having a certain length;

(b) a second optical waveguide including a guide portion, said guide portion including a coupling section substantially parallel to said coupling section of said guide portion of said first optical waveguide, said coupling section of said guide portion of said second optical waveguide having a certain length;

(c) an optical medium intervening between said coupling sections, thereby providing said coupling sections with a certain beat length, with respect to monochromatic light transmitted by said waveguides, that is longer than a larger of said lengths of said coupling sections; and (d) a coupling enhancement mechanism operative to reduce said beat length to below a smaller of said lengths of said coupling sections by coupling at least one mode confined to said coupling section of said first waveguide with at least one mode confined to said coupling section of said second waveguide via at least one mode common to both of said coupling sections.

2. The optical coupler of claim 1, wherein said coupling enhancement mechanism is reversible.

3. The optical coupler of claim 1, wherein each of said first and second waveguides has a high pass frequency, and wherein said beat length provided by said optical medium with respect to said monochromatic light of a larger of said two high pass frequencies is at least about one centimeter.

4. The optical coupler of claim 1, wherein each of said first and second waveguides has a high pass frequency, and wherein said beat length provided by said optical medium with respect to said monochromatic light of a larger of said two high pass frequencies is at least about 10 meters.

5. The optical coupler of claim 1, wherein each of said first and second waveguides has a high pass frequency, and wherein said beat length provided by said optical medium with respect to said monochromatic light of a larger of said two high pass frequencies is at least about one kilometer.

6. The optical coupler of claim 1, wherein said coupling enhancement mechanism is operative to reduce said beat length by at least two orders of magnitude.

7. The optical coupler of claim 1, wherein said coupling enhancement mechanism is operative to reduce said beat length by at least three orders of magnitude.

8. The optical coupler of claim 1, wherein said coupling enhancement mechanism is operative to reduce said beat length by at least five orders of magnitude.

9. The optical coupler of claim 1, wherein said guide portion of said first optical waveguide has an index of refraction, wherein said guide portion of said second optical waveguide has an index of refraction, and wherein said coupling enhancement mechanism includes:

(i) a mechanism for reversibly imposing a periodic structure on said index of refraction of said guide portion of said first optical waveguide along said coupling section of said guide portion of said first optical waveguide; and (ii) a mechanism for reversibly imposing a periodic structure on said index of refraction of said guide portion of said second optical waveguide along said coupling section of said guide portion of said second optical waveguide.

10. An optical system, comprising:

(a) a first optical waveguide including a guide portion, said guide portion including a plurality of coupling sections, each of said coupling sections of said guide portion of said first optical waveguide having a certain length;

(b) a plurality of second optical waveguides, each of said second optical waveguides including a guide portion, said guide portion of said each second optical waveguide including a coupling section substantially parallel to a corresponding one of said coupling sections of said guide portion of said first optical waveguide, said coupling section of said guide portion of said each second optical waveguide having a certain length; and (c) for each of said second optical waveguides:

(i) an optical medium intervening between said coupling section of said guide portion of said each second optical waveguide and said corresponding coupling section of said guide portion of said first waveguide, thereby providing said coupling section of said guide portion of said each second optical waveguide and said corresponding coupling section of said guide portion of said first waveguide with a certain beat length, with respect to monochromatic light transmitted by said waveguides, that is longer than a larger of said length of said coupling section of said guide portion of said each second waveguide and said length of said corresponding coupling section of said guide portion of said first waveguide, and (ii) a coupling enhancement mechanism operative to reduce said beat length to below a smaller of said length of said coupling section of said guide portion of said each second waveguide and said length of said corresponding coupling section of said guide portion of said first waveguide;

said coupling enhancement mechanism of at least one of said second optical waveguides being operative to couple at least one mode confined to said coupling section of said at least one second waveguide with at least one mode confined to said corresponding coupling section of said first waveguide via at least one mode common to both of said coupling sections.

11. The optical system of claim 10, wherein at least one of said coupling enhancement mechanisms is reversible.

12. The optical system of claim 10, wherein said guide portion of said first optical waveguide has an index of refraction, wherein said guide portion of at least one of said second optical waveguides has an index of refraction, and wherein said coupling enhancement mechanism of said at least one second optical waveguide includes:

(i) a mechanism for reversibly imposing a periodic structure on said index of refraction of said guide portion of said first optical waveguide along said coupling section of said guide portion of said first waveguide; and (ii) a mechanism for reversibly imposing a periodic structure on said index of refraction of said guide portion of said at least one second optical waveguide along said coupling section of said guide portion of said at least one second optical waveguide.

13. The optical system of claim 10, wherein said first waveguide has a first high pass frequency, wherein at least one of said second waveguides has a second high pass frequency, and wherein said beat length provided by said optical medium for said coupling section of said guide portion of said at least one second waveguide and said corresponding coupling section of said guide portion of said first waveguide with respect to monochromatic light of a larger of said first high pass frequency and said second high pass frequency is at least about one centimeter.

14. The optical system of claim 10, wherein said first waveguide has a first high pass frequency, wherein at least one of said second waveguides has a second high pass frequency, and wherein said beat length provided by said optical medium for said coupling section of said guide portion of said at least one second waveguide and said corresponding coupling section of said guide portion of said first waveguide with respect to monochromatic light of a larger of said first high pass frequency and said second high pass frequency is at least about 10 meters.

15. The optical system of claim 10, wherein said first waveguide has a first high pass frequency, wherein at least one of said second waveguides has a second high pass frequency, and wherein said beat length provided by said optical medium for said coupling section of said guide portion of said at least one second waveguide and said corresponding coupling section of said guide portion of said first waveguide with respect to monochromatic light of a larger of said first high pass frequency and said second high pass frequency is at least about one kilometer.

16. The optical system of claim 10, wherein, for at least one of said second optical waveguides, said coupling enhancement mechanism is operative to reduce said beat length by at least two orders of magnitude.

17. The optical system of claim 10, wherein, for at least one of said second optical waveguides, said coupling enhancement mechanism is operative to reduce said beat length by at least three orders of magnitude.

18. The optical system of claim 10, wherein, for at least one of said second optical waveguides, said coupling enhancement mechanism is operative to reduce said beat length by at least five orders of magnitude.

\* \* \* \* \*